(12) United States Patent
Pairault et al.

(10) Patent No.: US 8,577,892 B2
(45) Date of Patent: Nov. 5, 2013

(54) UTILIZING AFFINITY GROUPS TO ALLOCATE DATA ITEMS AND COMPUTING RESOURCES

(75) Inventors: Remy Pairault, Redmond, WA (US); Zhe Yang, Redmond, WA (US); Sriram Krishnan, Seattle, WA (US); George Moore, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 505 days.

(21) Appl. No.: 12/479,525

(22) Filed: Jun. 5, 2009

(65) Prior Publication Data

US 2010/0312891 A1 Dec. 9, 2010

(51) Int. Cl.
*G06F 17/30* (2006.01)

(52) U.S. Cl.
USPC ............ 707/743; 707/740; 707/741; 707/750

(58) Field of Classification Search
CPC ................................. G06F 17/30; G06F 17/00
See application file for complete search history.

(56) References Cited

U.S. PATENT DOCUMENTS

| | | | | |
|---|---|---|---|---|
| 4,260,579 A | * | 4/1981 | Barton et al. ................... | 436/12 |
| 4,304,488 A | * | 12/1981 | Asakura et al. ................. | 356/39 |
| 4,354,213 A | * | 10/1982 | Martinelli ..................... | 360/133 |
| 4,355,018 A | * | 10/1982 | Hansen et al. ................ | 424/1.73 |
| 4,403,038 A | * | 9/1983 | Asakura et al. ................. | 436/16 |
| 4,415,982 A | * | 11/1983 | Nishikawa ............... | 250/363.02 |
| 4,419,164 A | * | 12/1983 | Martinelli ................ | 156/244.11 |
| 4,432,057 A | * | 2/1984 | Daniell et al. ................ | 707/610 |
| 4,488,991 A | * | 12/1984 | Tolman et al. ................ | 530/395 |
| 4,502,910 A | * | 3/1985 | Voltmer et al. ............... | 156/361 |
| 4,562,292 A | * | 12/1985 | Hammock et al. .............. | 568/43 |
| 4,564,596 A | * | 1/1986 | Maximenko et al. ......... | 435/177 |
| 4,609,593 A | * | 9/1986 | Nakashima et al. .......... | 428/611 |
| 4,613,947 A | * | 9/1986 | Suzuka et al. ................ | 356/405 |
| 4,809,157 A | * | 2/1989 | Eilert et al. .................... | 718/104 |
| 4,815,025 A | * | 3/1989 | Ossfeldt et al. ................. | 714/53 |
| 5,303,214 A | * | 4/1994 | Kulakowski et al. ......... | 369/30.3 |
| 5,347,651 A | * | 9/1994 | Burke et al. ......................... | 1/1 |
| 5,481,691 A | * | 1/1996 | Day et al. ...................... | 711/133 |
| 5,506,987 A | * | 4/1996 | Abramson et al. ............ | 718/103 |

(Continued)

OTHER PUBLICATIONS

"Geo Location Enables Developers to Choose Data Centers and Group Applications & Storage"; Mar. 18, 2009; http://blogs.msdn.com/windowsazure/archive/2009/03/18/geo-location-enables-developers-to-choose-data-centers-and-group-applications-storage.aspx.

(Continued)

*Primary Examiner* — Farhan Syed
(74) *Attorney, Agent, or Firm* — Shook, Hardy & Bacon L.L.P.

(57) ABSTRACT

Systems and methods for utilizing affinity groups to allocate data items and computing resources are disclosed. Upon receipt of a user preference indicating an affinity group, a token associated with that affinity group may be stored in a database. The affinity group may be associated with a geographic region or a number of data centers. Data items and computing resources may be associated with the affinity group. These data items and computing resources may be allocated to a geographic region or data center based on their association with the affinity group. These data items and computing resources may also be reallocated based on efficiency analyses or user preferences. In this way, data items and computing resources may be efficiently allocated with lower user effort.

17 Claims, 5 Drawing Sheets

(56) References Cited

U.S. PATENT DOCUMENTS

| | | | | |
|---|---|---|---|---|
| 5,535,393 | A | * | 7/1996 | Reeve et al. ................ 717/149 |
| 5,546,557 | A | * | 8/1996 | Allen et al. .................. 711/111 |
| 5,734,861 | A | * | 3/1998 | Cohn et al. .................. 711/134 |
| 6,020,139 | A | * | 2/2000 | Schwartz et al. ................ 506/7 |
| 6,151,643 | A | | 11/2000 | Cheng et al. |
| 6,195,682 | B1 | * | 2/2001 | Ho et al. ...................... 709/203 |
| 6,427,227 | B1 | | 7/2002 | Chamberlain |
| 6,434,744 | B1 | | 8/2002 | Chamberlain et al. |
| 6,816,905 | B1 | | 11/2004 | Sheets |
| 7,082,603 | B2 | | 7/2006 | Hisatake |
| 2003/0040324 | A1 | * | 2/2003 | Eldering et al. ............. 455/456 |
| 2003/0065762 | A1 | * | 4/2003 | Stolorz et al. ................ 709/223 |
| 2004/0103195 | A1 | | 5/2004 | Chalasani |
| 2006/0064478 | A1 | * | 3/2006 | Sirkin .......................... 709/223 |
| 2006/0112170 | A1 | * | 5/2006 | Sirkin .......................... 709/217 |
| 2007/0283282 | A1 | | 12/2007 | Bonfiglio |
| 2008/0080552 | A1 | | 4/2008 | Gates |
| 2008/0276234 | A1 | | 11/2008 | Taylor |
| 2009/0070337 | A1 | | 3/2009 | Romem |
| 2009/0119394 | A1 | * | 5/2009 | Winkler ........................ 709/223 |
| 2009/0172033 | A1 | * | 7/2009 | Clark et al. ................ 707/104.1 |
| 2010/0076933 | A1 | * | 3/2010 | Hamilton et al. ............. 707/640 |

OTHER PUBLICATIONS

Prabhakar Chaganti, "Cloud computing with Amazon Web Services, Part 2: Storage in the cloud with Amazon Simple Storage Service (S3)"; Aug. 19, 2008, pp. 1-3, http://www.ibm.com/developerworks/library/ar-cloudaws2/.

Broberg, James, et al., "Creating a 'Cloud Storage' Mashup for High Performance, Low Cost Content Delivery"; Apr. 6, 2009, pp. 178-183, Department of Computer Science and Software Engineering, The University of Melbourne, Australia, http://www.gridbus.org/papers/CloudStorage-ICSOC-2008.pdf.

"The Planet Introduces New Cloud Storage Service"; pp. 1-4, Nov. 28, 2008, http://webhostinggeeks.com/blog/2008/11/28/the-planet-introduces-new-cloud-storage-service/.

"The Availability Digest—Can You Trust the Compute Cloud", pp. 1-6, Aug. 2008, http://www.availabilitydigest.com/public_articles/0308/amazon.pdf.

Broberg, James et al., "MetaCDN: Harnessing 'Storage Clouds' for high performance content delivery", pp. 1-13, Apr. 6, 2009, Department of Computer Science and Software Engineering, The University of Melbourne, Australia, http://www.gridbus.org/reports/metacdn2008.pdf.

Fishteyn, Daniil, "Deploying Software as a Service (SaaS)", pp. 1-11, Apr. 6, 2009, http://www.siia.net/ondemand/2008/saas.com_whitepaper_part1.pdf.

Crump, George, "Cloud Storage's Killer App . . . Geographic Collaboration", Feb. 10, 2009, pp. 1-3, http://www.informationweek.com/blog/main/archives/2009/02/cloud_storages_1.html.

"Data Center Co-Locations Services" pp. 1-2, Apr. 3, 2009, http://www.ptsdcs.com/datacentercolo.asp.

Calder, Bradley Gene, et al., "Geographic Co-Location Service for Cloud Computing"; U.S. Appl. No. 12/479,195, filed Jun. 5, 2009.

Non-Final Office Action mailed Aug. 4, 2011 regarding U.S. Appl. No. 12/479,195 21 pages.

Final Office Action mailed Jan. 10, 2012 regarding U.S. Appl. No. 12/479,195 25 pages.

Non-Final Office Action mailed Jun. 5, 2013 in U.S. Appl. No. 12/479,195; 29 pages.

* cited by examiner

UTILIZING AFFINITY GROUPS TO ALLOCATE DATA ITEMS AND COMPUTING RESOURCES

CROSS-REFERENCE TO RELATED APPLICATIONS

This application is related by subject matter to the invention disclosed in the commonly assigned application U.S. application Ser. No. 12/479,195 filed on even date herewith, entitled "Geo-location service for Cloud Computing Infrastructure."

BACKGROUND

In distributed computing environments, users must typically oversee details of data items and computing resources. For example, a website or other network resource may need to execute processing tasks, such as server code or database queries, as well as store and stream data items, such as images, text or the database information. In some web environments, there may be multiple processing resources and multiple data items. Each of these data items and computing resources must usually be located at a computing device, which often resides at a data center. Various data items and computing resources may require being at the same or different data centers. Computing resources and data resources should be allocated efficiently to computing devices and data centers such that performance does not suffer.

BRIEF SUMMARY

Embodiments of the present invention relate to systems and methods for allocating data items and computing resources. Upon receipt of a user preference indicating an affinity group, a token associated with that affinity group may be stored in a database. The user preference may be associated with an affinity group, which in turn may be associated with a number of data centers. An affinity group may also be associated with a geographic region. A geographic region may be associated with a number of data centers. Data items may be allocated to one of the plurality of data centers based on analyzing the token. Computing resources may also be allocated to one of the plurality of data centers based on analyzing the token.

This Summary is provided to introduce a selection of concepts in a simplified form that are further described below in the Detailed Description. This Summary is not intended to identify key features or essential features of the claimed subject matter, nor is it intended to be used as an aid, in isolation, in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
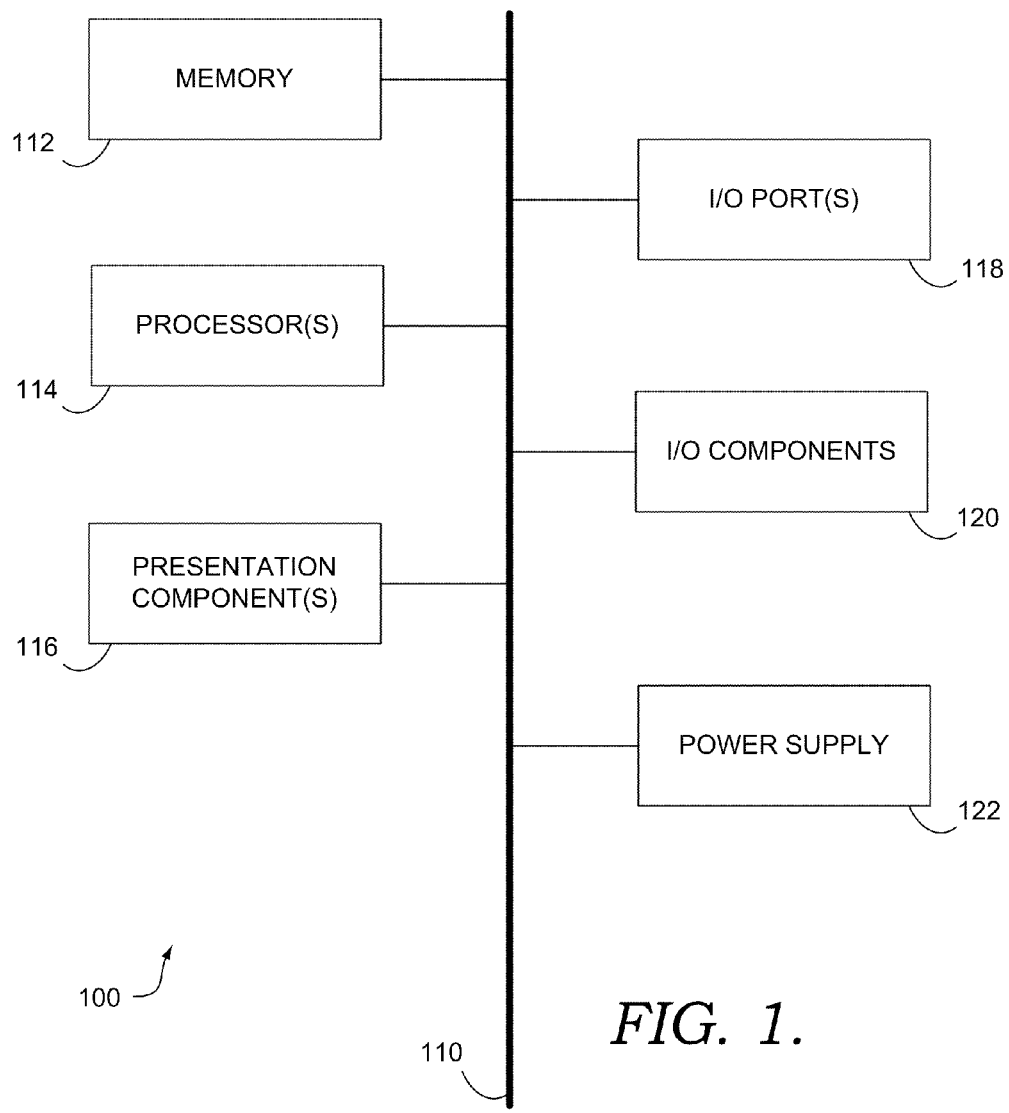
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention relate to systems and methods for allocating data items and computing resources. A data item may be any resource capable of being provided by a computer, such as text, an image file, a sound file, a binary file, color codes, html files, CSS files, JavaScript code, computing time on a computing resource, etc. A computing resource includes database engines and servers (an SQL servers, etc), web servers, code processing applications, server-side processing resources (such as PHP processing resources, Perl processing resources, etc), bandwidth resources, routers, may comprise a server or shared server resource (such as a virtual private server or shared hosting service), and may be necessarily associated with a data item such as computing time allocated to a web service.

Upon receipt of a user preference indicating an affinity group, a token associated with that affinity group may be stored in a database. An affinity group is generally a group of data items, a group of data items and computing resources, or a group of computing resources that are logically grouped together. Grouping data items and computing resources together via affinity groups provides efficient assignment of groups to a particular data center, geographic location, etc. Such grouping also allows for efficient management of a group of items, such that each item does not have to be manipulated individually. The token may be, for example, data stored in an SQL database that associates a particular user with an affinity group.

As an example, an affinity group may be utilized by a server to determine associations between different data items and computing resources. Thus, an affinity group may be used to group a data item together with another data item, to group a data item together with a computing resource, or to group a computing resource with another computing resource (or any other combination thereof). In addition, the affinity group may be associated with a data center or a number of data centers. A data center is generally a location comprising one or more computer servers connected to the network to serve data to users, and will generally comprise multiple servers that may host a number of computing resources. Associating multiple data items with an affinity group would allow, for example, allocating these multiple data items to the same geographic region (to either one data center within a geographic region or among a number of data centers within a geographic region) or the same data center. The affinity group may preferentially be associated with a geographic region, allowing data items to be grouped together into the same geographic region by associating them with the affinity group.

Accordingly, in one embodiment, the present invention provides one or more computer-storage media storing computer-usable instructions that, when executed by a computing-device, perform a method for allocating a data item. The method includes receiving a first user preference indicating a first affinity group. The first affinity group will be associated with a first plurality of data centers. The method also includes storing a first token associated with the first affinity group in a database. The method further includes determining to store a first data item in one of the first plurality of data centers based on analyzing the first token. The method also includes storing the first data item in the one of the first plurality of data centers.

In another embodiment, the present invention provides a method for allocating data items. The method includes receiving a user preference indicating an affinity group. The affinity group will be associated with a plurality of data centers. The method also includes storing a token associated with the affinity group in a database. Further, the method includes determining to store a first data item in one of the plurality of data centers based on analyzing the token in a first computer process and providing the determination to a second computer process. The method still further includes storing the first data item in the one of the plurality of data centers by the second computer process. The method additionally includes determining to store a second data item in the one of the plurality of data centers based on analyzing the token in a third computer process and providing the determination to a fourth computer process. The method still further includes storing the second data item in the one of the plurality of data centers by the fourth computer process.

In yet another embodiment, the present invention provides one or more computer-storage media storing computer-useable instructions that, when executed by a computing device, perform a method for allocating data items. The method includes receiving a user preference indicating an affinity group. This affinity group is associated with a geographic region, which is itself associated with a plurality of data centers. The method also includes storing a token associated with the affinity group in a database. The method further includes receiving a first data item. This first data item has an attribute indicating an association with the token. The method further includes determining to store the first data item in one of the plurality of data centers based on analyzing the token. The method also includes storing the first data item in the one of the plurality of data centers. The method additionally includes receiving a second data item. This second data item has an attribute indicating an association with the token. The method still further includes determining to store the second data item in the one of the plurality of data centers based on analyzing the token. The method further includes storing the second data item in one of the plurality of data centers.

Having briefly described an overview of the present invention, an exemplary operating environment in which various aspects of the present invention may be implemented is now described. Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a personal data assistant or other handheld device. Generally, program modules, including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, and the like. The invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Additionally, many processors have memory. The inventor hereof recognizes that such is the nature of the art, and reiterates that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

The computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, Random Access Memory (RAM), Read Only Memory (ROM), Electronically Erasable Programmable Read Only Memory (EEPROM), flash memory or other memory technology, CD-ROM, digital versatile disks (DVD) or other holographic memory, magnetic cassettes, magnetic tape, magnetic disk storage or other magnetic storage devices, carrier wave, or any other medium that can be used to encode desired information and which can be accessed by the computing device 100.

The memory 112 includes computer-storage media in the form of volatile and/or nonvolatile memory. The memory may be removable, non-removable, or a combination thereof. Exemplary hardware devices include solid-state memory, hard drives, optical-disc drives, etc. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative components include a microphone, joystick, game pad, satellite dish, scanner, printer, wireless device, etc.

Figure 2:
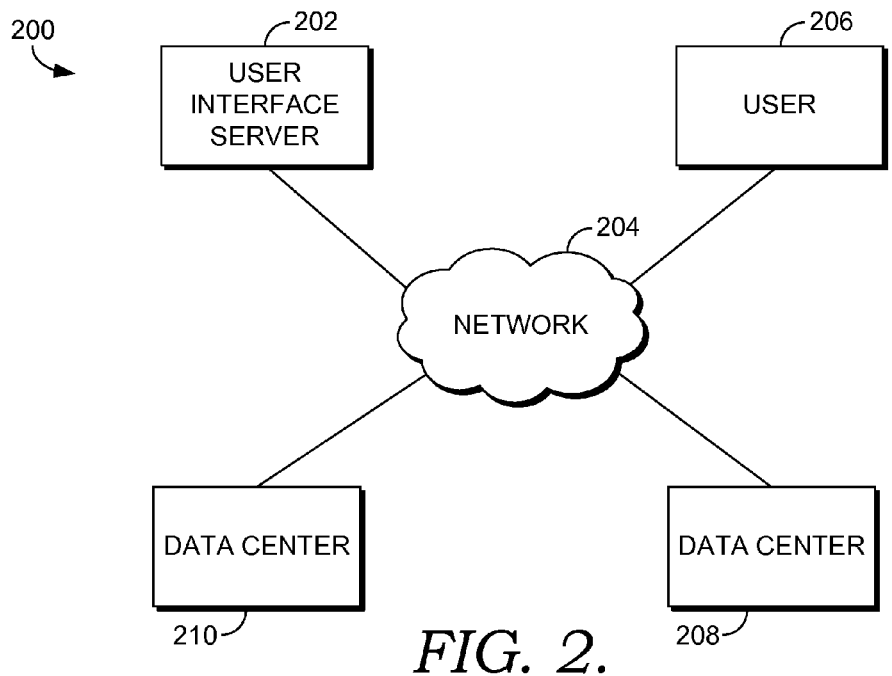
FIG. 2 is a block diagram of an exemplary computing system suitable for receiving user preferences, storing tokens associated with affinity groups, and allocating data items in accordance with an embodiment of the present invention.

Turning now to FIG. 2, a block diagram is illustrated, in accordance with an embodiment of the present invention, showing an exemplary computing system 200 configured to allocate data items and computing resources. It will be understood and appreciated by those of ordinary skill in the art that the computing system 200 shown in FIG. 2 is merely an example of one suitable computing system environment and is not intended to suggest any limitation as to the scope of use or functionality of embodiments of the present invention. Neither should the computing system 200 be interpreted as having any dependency or requirement related to any single component or combination of components illustrated therein. Further, the computing system 200 may be provided as a stand-alone product, as part of a software development environment, or any combination thereof.

The computing system 200 includes user device 206, user interface server 202, data center 208, and data center 210, all in communication with one another via a network 204. The network may include, without limitation, one or more local area networks (LANs) and/or wide area networks (WANs). Such networking environments are commonplace in offices, enterprise-wide computer networks, intranets and the Internet. Accordingly, network 204 is not further described herein. Descriptions of "connecting," "transmitting" or "communicating" used throughout are understood to encompass utilizing a network such as network 204 to achieve such actions. Accordingly, descriptions of "connecting," "transmitting," or "communicating" with various systems or components may either mention or omit the mention of utilizing a network to achieve such actions yet are to be understood as possibly including such utilization.

Data center 208 and data center 210 are configured to store and provide data items, store and provide computer resources, or both. In various embodiments, data center 208 and data center 210 may store or provide, without limitation, tokens associated with user preferences, web pages, databases, web servers, web services, web service applications, applications, images, documents, data streaming capabilities, etc. The content and volume of such information are not intended to limit the scope of embodiments of the present invention in any way. Further, though illustrated as a single, independent component, data center 208 may, in fact, be a plurality of computer components, such as multiple servers, database clusters, etc.

Each of the user device 206 and the user interface server 202 shown in FIG. 2 may be any type of computing device, such as, for example, computing device 200 described above with reference to FIG. 2. By way of example only and not limitation, each of the user device 206 and the search engine 202 may be a personal computer, desktop computer, laptop computer, handheld device, mobile handset, consumer electronic device, and the like. Additionally, the user device 206 may further include a keyboard, keypad, stylus, joystick, and any other input-initiating component that allows a user to provide wired or wireless data to the network 204, e.g., search queries, web page addresses, and the like. It should be noted, however, that the present invention is not limited to implementation on such computing devices, but may be implemented on any of a variety of different types of computing devices within the scope of embodiments hereof.

The user device 206 is configured to receive use preferences input by a user (e.g., utilizing a keypad, mouse, or the like) and to transmit such user preferences, via network 204, to the user interface server 202. In turn, the user interface server 202 is configured to receive user preferences, including the creation, modification, and deletion of affinity groups. The user device 206 may also be configured to transmit data items and computing resource requests to user interface server 202, data center 208, or data center 210. In turn, user interface server 202, data center 208, or data center 210 may be configured to receive data items or to provide computing resources.

The user interface server 202 is further configured to store tokens associated with affinity groups. These tokens may be stored on the user interface server 202, in data center 208 or data center 210, or in a database elsewhere connected to network 204. A token may group data center 208 into an affinity group by itself, may group data center 208 into an affinity group with data center 210, or may group data center 208 into an affinity group with various other data centers or computing devices that may be connected to network 204. The user interface server 202 is further configured to determine whether to store a first data item in data center 208 or data center 210 based on analyzing one or more stored tokens. The user interface server 202 is additionally configured to direct the storage of a data item to data center 208 or to data center 210. User interface server 202 is also configured to direct data center 208 or data center 210 to provide a computing resource. User interface server 202 is also configured to modify or remove tokens. User interface server 202, data center 208, and data center 210 are further configured to provide data items through network 204 for presentation, for instance, on a display device associated the user device 206. Each of these functions is described more fully below with respect to FIGS. 3-6.

Figure 3:
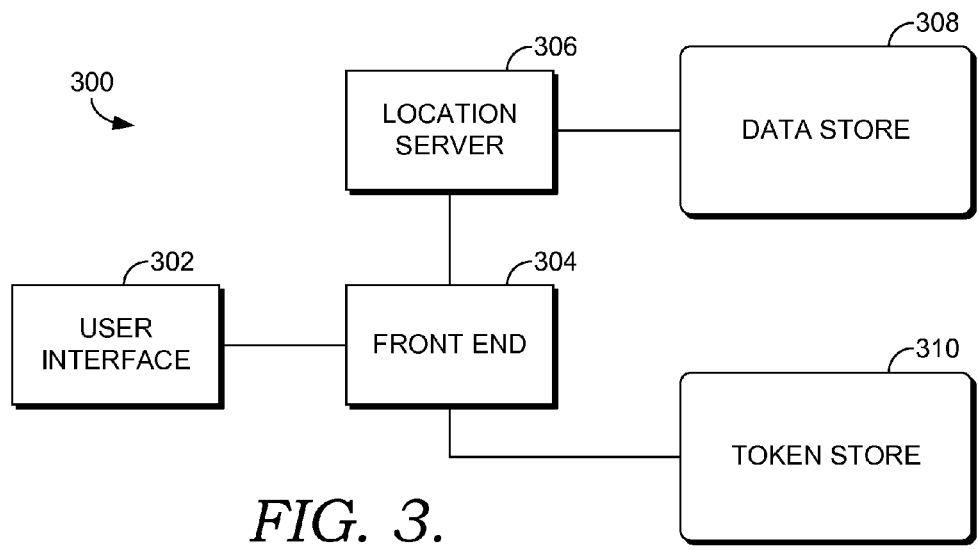
FIG. 3 is a diagram showing a system for allocating data items in accordance with an embodiment of the present invention.

Turning now to FIG. 3, a diagram showing a system 300 for allocating data items in accordance with an embodiment of the present invention is depicted. The system 300 includes user interface 302, front end 304, location service 306, data store 308, and token store 310. Each of these components may reside on separate computers or computer servers, on the same computer or computer servers, or on a combination thereof. For example, user interface 302, front end 304 and location service 306 may reside on a user interface server (e.g., user interface server 302), while token store 310 and data store 308 may reside in a data center (e.g., data center 208 or data center 210). This is but one possible configuration described for illustrative purposes and should not be taken to limit the present invention, as many such configurations are possible in accordance with embodiments.

A user device (such as, for instance, user device 206) connects to a user interface server (such as, for instance, user interface server 202), which provides user interface 302 to the user device. User interface 302 may allow the user to see configuration settings for a number of affinity groups, as well as allow the user to create, edit, and delete affinity groups. The user may also be able to assign data items and computing resources to affinity groups. Affinity groups may also be used to create logical groupings of external internet traffic routing options between datacenters. For example, a user may assign geo-based traffic routing such that a user in Texas would automatically have her traffic requests sent to a data center located in the southwest United States.

User interface 302 may also allow a user, via a user device, to configure affinity groups—e.g., assign data centers, geographic regions, data capacity settings, user permissions, names, etc, to a particular affinity group. These and other attributes associated with affinity groups may be referred to generally as traits. These configurations are transmitted from the user device via user interface 302 to front end 304 (via network 204 for instance). Front end 304 may communicate with token store 310 (also via network 204, for example) to determine the appropriate affinity group to configure based on the configurations received.

For instance, a user may desire to create an affinity group and associate it with a particular geographic region (perhaps because a web service that the user is providing is advantageously utilized in a particular geographic region such as, for example, the southwest United States). The user can accomplish this by connecting a user device to a user interface server. The user will be presented with user interface 302. User interface 302 will include the ability to create an affinity group and associate it with a particular geographic region. The user will transmit a creation request through the use of user interface 302 to front end 304. Front end 304 will then connect to token store 310 to create a token indicating a new affinity group, the appropriate geographic settings for the affinity group, and the user. It should be noted that, although "token" as used is singular, the present invention contemplates that a token may include a number of data associated with a particular affinity group and the affinity group's traits. A "token" may, for instance, consist of a single entry in a database indicating the user to whom the affinity group belongs and an associated data center. Alternatively, a token may include a number of data entries in one or more databases residing on one or more computing devices indicating a number of traits pertaining to an affinity group, such as various associated data items, computing resources, data centers, affinity group names, geographic regions, bandwidth allowances, affiliated users and user permissions, etc.

It should be noted that a user may also create, modify and delete an affinity group without interacting with user interface 302 (perhaps, for example, through the use of an API). For instance, and elaborating on the above example, an API may expose the above affinity group functionality, thereby allowing the user to configure an affinity group or an affinity group trait without connecting to user interface 302. This could be accomplished by, for example, a third party providing to the user a website or software application that interfaces with the API functionality. This third party website or application software may connect with the API to obtain functionality similar to that accessible through user interface 302, such as allowing a user to create, modify, or delete an affinity group or affinity group trait. Continuing with the above example, a user may connect to this third party website or application (which is configured to interact with the API) and be presented with a creation, modification and deletion functionalities related to an affinity group. The user may then interact with this third party website, which may in turn call API functions to accomplish the desired actions (which could cause, for example, the modification of a token associated with an affinity group). This API may, for example, communicate the status of an affinity group, the traits of an affinity group, the current or past settings of an affinity group, and the successfulness of any attempted actions undertaken by the API.

In an example in accordance with an embodiment of the present invention, a user may desire to modify an affinity group's geographic region. In this case, the user would connect via user device to a user interface server and be presented with user interface 302. User interface 302 will present the user with an affinity group and may show the current settings. The user will select the affinity group and select to change the associated geographic region. For example, the user may select the affinity group and be presented with a select box displaying a number of geographic regions, any of which may be selected via a user input device such as a mouse. Upon the selection of a geographic region by the user, data is transmitted to front end 304 which communicates with token store 310 to determine the appropriate token to modify in order to change the geographic region associated with an affinity group. This token will then be modified within token store 310 such that the affinity group is associated with the selected geographic region. It should be noted that a number of affinity group traits may be modified in this manner.

In another example in accordance with embodiments of the present invention, a user may desire to delete an affinity group. In this case, the user would again connect via user device to a user interface server and be presented with user interface 302. User interface 302 will present the user with an affinity group. The user will select the affinity group and determine to delete it. This command is transmitted to front end 304 which communicates with token store 310 to determine the appropriate token to either modify or delete from token store 310. This token will then be modified or deleted within token store 310 such that the affinity group is either deleted or marked as inactive.

After a user has created an affinity group, data items and computing resources may be associated with the affinity group. For instance, a user may have created an affinity group through a process similar to that outlined above. The user may create a storage account associated with this affinity group by interacting with user interface 302 or through the use of an API. The user may then be provided with a logical DNS name that is associated with this storage account, such as, for example, "user22.affinitygroup.net." Any future interactions with this logical DNS can then be preferentially associated with the created storage account (and thus with the associated affinity group). For example, the user might upload a JPEG picture via interaction with "user22.affinitygroup.net." That the user uploaded the JPEG via interaction with "user22.affinitygroup.net" will cause the JPEG to be stored in the appropriate geo-region because this particular logical DNS has been associated with the storage account, which is in turn associated with the affinity group associated with the geo-region. For instance, a token may be stored that is associated with the affinity group and the storage account. Upon receiving a request for a file to be uploaded to "user22.affinitygroup.net," the token may be analyzed to determine that the file should be stored in accordance with the affinity group preferences. The file that is then received may be appropriately directed to a data center in the appropriate geo-region.

In another example in accordance with an embodiment of the present invention, the user may again wish to upload a JPEG and have it be associated with an affinity group. The user may connect to a user interface server and be presented with user interface 302. The user then chooses to upload the JPEG picture and to have the JPEG picture associated with the affinity group. This request will be transmitted to front end 304. Front end 304 will connect to token store 310 to determine a data center associated with the affinity group by analyzing a token. Front end 304 will communicate to location service 306, which directs the storage of the JPEG data item to a data center (such as, for example, data center 208) within data store 308.

In a further example, a user may desire to associate a computing resource, such as a web server, with the created affinity group. To accomplish this, the user connects to a user interface server and is presented with user interface 302. The user indicates that he or she desires to allocate a web server and desires to associate this web server with the affinity group. This request is transmitted to front end 304. Front end 304 connects to token store 310 to determine a geographic region associated with the affinity group by analyzing a stored token. Front end 304 communicates to location service 306, which determines that a data center (such as, for example, data store 208) within data store 308 is within the particular geographic region. Data store 308 allocates a web server within the appropriate data center.

In yet another example in accordance with embodiments of the present invention, data items or computing resources may be reallocated. For example, a user connects to a user interface server and is presented with user interface 302. The user has, for example, previously created an affinity group that is associated with a first geographic region; the affinity group also has a data item associated with it in a first data center within the first geographic region. The user may indicate the he or she desires to change the geographic region associated with an affinity group to a second geographic region. This request is transmitted to front end 304, which connects to token store 310 to modify the geographic region associated with the affinity group to the second geographic region. Front end 304 communicates to location service 306, which determines that a second data center within data store 308 is within the second geographic region. Location service 306 directs data center 308 to reallocate the data item from the first data center within the first geographic region to the second center within the second geographic region. It should be noted that computing resources may similarly be reallocated to new geographic regions or data centers as appropriate. It should also be noted that a number of data items or computing resources may be reallocated in such a manner.

In another example in accordance with embodiments of the present invention, data items and computing resources associated with an affinity group may be duplicated among a plurality of data centers to provide failover capabilities. Failover capability may, for example, allow a second data center to provide a data item or computing resource in the case that there is an issue with the first data center which would otherwise preferentially serve a data item or computing resource. Or, in another example, failover capability may allow a second data center to provide a data item or computing resource should it be determined that the second data center might provide such items and resources more efficiently.

For example, a user may have previously created an affinity group associated with a first geographic region. The affinity group may have a data item associated with it at a first data center within the first geographic region. To provide failover capability, the system may, either dynamically or at the instruction of a user, create a duplicate of this data item at a second data center. When a web user wishes to retrieve this data item, they may by default be routed the data item from the first data center. It may be determined, perhaps through an efficiency analysis, that the first data center is either not responsive or is otherwise performing sub-optimally. Subsequent to this determination, web users may be routed the data item from the second data center. For example, location service 306 may receiving a request from a web user for the data item. Location server 306 may make a determination that the second data center could better respond to the request than the first data center. Upon making this determination, location service 302 may direct the second data center to send the data item to the web user instead of directing the first data center send the item to the web user.

In still another example in accordance with embodiments of the present invention, data items or computing resources may be reallocated dynamically. For example, an affinity group may be associated with a geographic region, which is itself associated with a first data center and a second data center. A data item may be associated with the affinity group and may reside at the first data center. An efficiency analysis may be performed to determine that the data item would be more optimally located at the second data center. The efficiency analysis may include, for example, comparing the average latency that would be experienced by a typical user retrieving the data item were it located in the second data center to the average latency experienced by a typical user retrieving the data item from the first data center. An efficiency analysis might also include, for example, a determination that there exists greater capacity at the second data center than the first, or that the first data center will be temporarily slow or shut down due to upgrades or power outages. An efficiency analysis might also include, for example, a determination that there is an infinitely long response time at one data center, indicating that perhaps the data center is experiencing failure and that the traffic should be automatically rerouted to and from a second data center. An efficiency analysis might still further include, for example, a determination that there exists greater processing time availability at the second data center than the first, and that computing resources affiliated with the affinity group could be optimally allocated at the second data center. There are many such efficiency analyses that are within the scope of the present invention, each of which may be applied generally to both data items and computing resources. Upon determining via the efficiency analysis that a data item could be advantageously stored at the second data center, the location service 306 directs the data store 308 to reallocate the data item.

Figure 4:
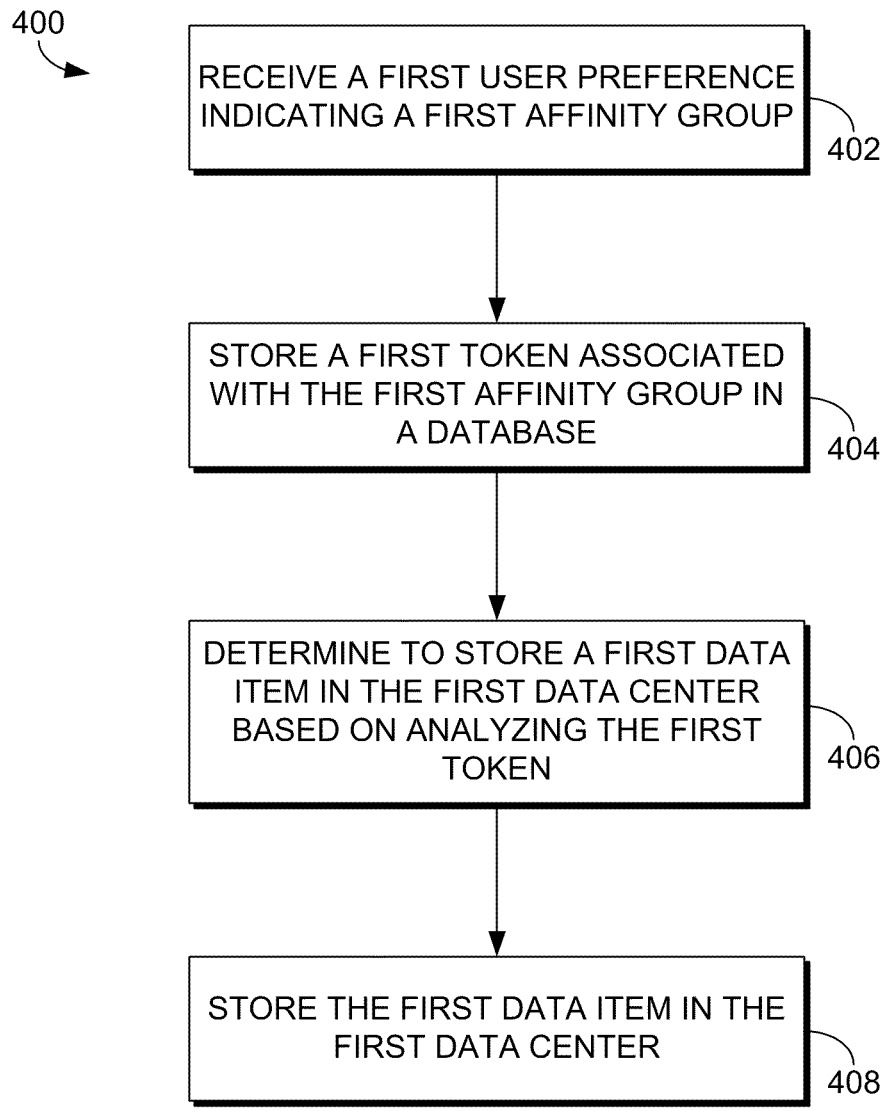
FIG. 4 is a flow diagram illustrating a method for allocating a data item in accordance with an embodiment of the present invention.

Turning now to FIG. 4, a flow diagram is illustrated that shows a method 400 for allocating a data item. As indicated at block 402, user preference is received (for instance, by user interface server 202 of FIG. 2). This user preference indicates a first affinity group. A first token associated with the first affinity group is stored in a database, as indicated at block 404 (e.g., at data center 208 of FIG. 2). As indicated at block 406, it is determined to store a first data item in one of the first plurality of data centers based on analyzing the first token. As indicated at block 408, the first data item is stored in the one of the first plurality of data centers.

For example, a user interface server may receive a first user preference indicating that a first affinity group should be created, as shown at block 402. This user preference may be generated by a user utilizing a user device and transmitted to a user interface server. The user may also indicate, at the time of creation or at a later time, that the first affinity group is to be affiliated with a particular name and a particular geographic region. The geographic region may be, for example, associated with a number of data centers in a particular part of a state or country. A token affiliated with this first affinity group is then stored in a database, as shown at block 404. A web page may be affiliated with the first affinity group, either automatically based on an analysis of the web page or after receiving an indication from the user associating the web page with the affinity group. The web page is associated with the first affinity group and the first affinity group is associated with the token. The token is then analyzed, as shown at block 406, and it is determined that the web page should be stored in the geographic region associated with the first affinity group. The web page is then stored in a first data center, as shown at block 408, which is within the appropriate geographic region. The web page will maintain its association with the first affinity group such that, should the first affinity group be later configured, the web page may be appropriately moved or modified as necessary. It should be noted that the web page could be reallocated to another data center within the geographic region as deemed appropriate through the use of an efficiency analysis or otherwise.

Further elaborating on the above example, a second data item may be associated with the first affinity group. For example, the user may have created a storage account associated with the first affinity group. The user might then receive a logical DNS associated with the storage account. The user could then indicates, through interaction with the logical DNS, that he or she wishes to upload a new MP3 sound file. The token associated with the first affinity group is then analyzed to determine the appropriate geographic region at which to store the MP3 file in accordance with the affinity group's properties. The MP3 file is then uploaded to the first data center, which is within the appropriate geographic region. While in the above example the MP3 file is located at the same data center as the data item, it should be noted that the MP3 file could also be uploaded to another data center within the appropriate geographic region. It should also be noted that the user may interact with a user interface (such as user interface 302 from FIG. 3) to indicate that he or she wishes the new MP3 sound file to be associated with a particular affinity group.

Computing resources may also be affiliated with the affinity group. For example, the user may desire to create an SQL server and associate the SQL server with the affinity group. The token associated with the affinity group is analyzed, and it is determined to allocate the SQL server to a data center within the appropriate geographic region. The SQL server could be allocated to, for example, the first data center and reside on the same computing device as the MP3 file. Alternatively, the SQL server could be allocated to a different computing device within the first data center. In still another alternative, the SQL server could be allocated to a second data center within the geographic region. Should the affinity group's configuration later be modified such that it is associated with a second geographic region and a different set of data centers, the web page, MP3 file, and SQL server could all be reallocated to different computing devices within the second geographic region.

In addition to the examples outlined above, data items and computing resources associated with a first affinity group may be duplicated to a second affinity group. For instance, continuing the above example, the user may create a second affinity group associated with a second geographic region. The web page, MP3 file, and SQL server could be additionally associated with this second affinity group, whether via association with a logical DNS or by direct user association via user interface 302. Upon being thusly associated, the web page, MP3 file, and SQL server could be duplicated to a third data center within the second geographic region. It should be noted that these items may be synchronized. For example, the user may modify the web page at the first data center. Upon determining that this web page is associated with both the first affinity group and the second affinity group, the web page at the third data center is modified to reflect the changes made to the web page at the first data center. Similarly, should the user update the settings of the SQL server at the third data center, the settings of the SQL server at the first data center could be modified appropriately to reflect these changes.

Figure 5:
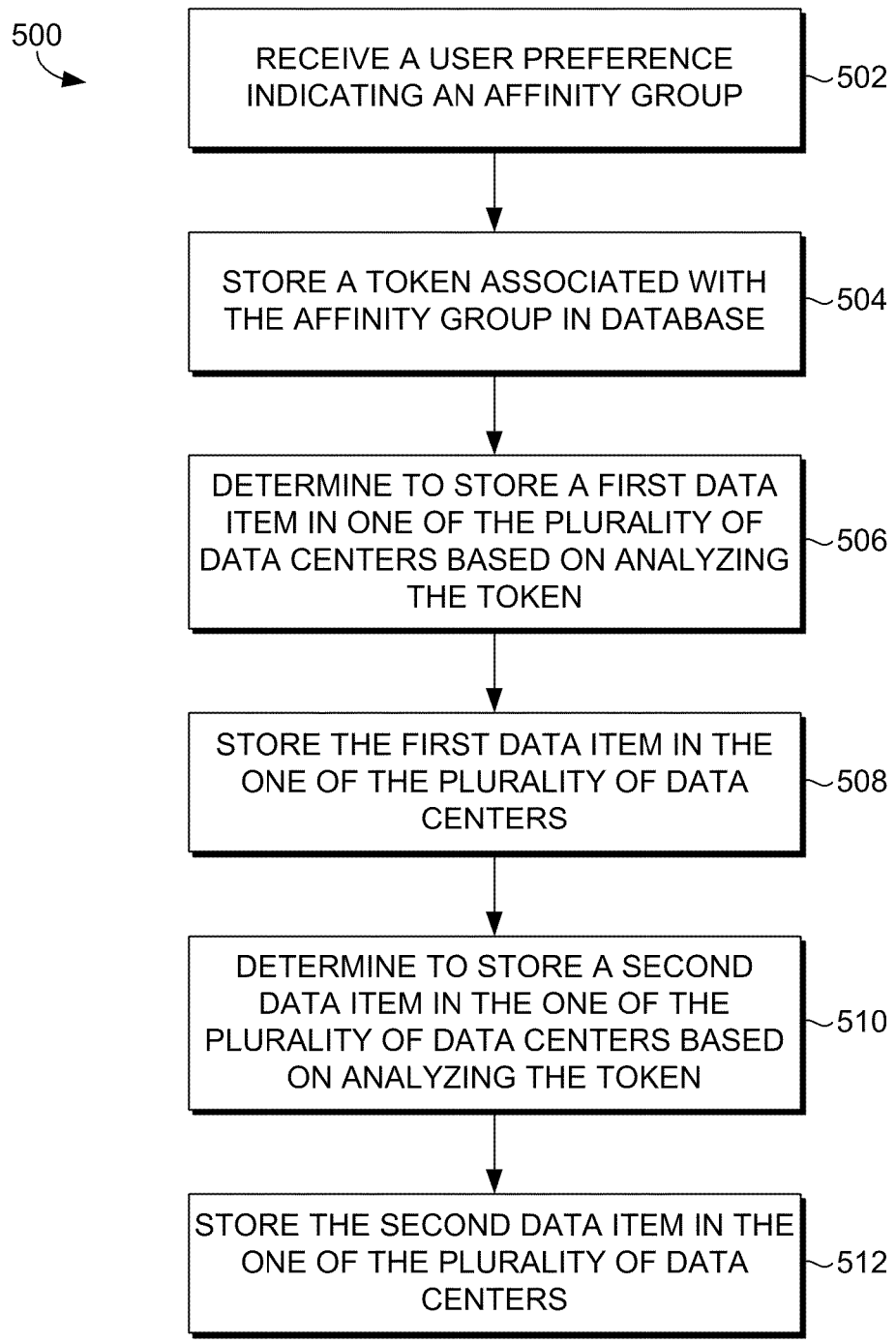
FIG. 5 is a flow diagram illustrating a method for allocating data items in accordance with an embodiment of the present invention.

With reference now to FIG. 5, a flow diagram is illustrated that shows a method 500 for allocating data items. As indicated at block 502, user preference is received (for instance, by user interface server 202 of FIG. 2). This user preference indicates an affinity group. A token associated with the affinity group is stored in a database, as indicated at block 504 (e.g., at token store 310 of FIG. 3). As indicated at block 506, it is determined to store a first data item in one of the first plurality of data centers based on analyzing the token. As indicated at block 508, the first data item is stored in the one of the first plurality of data centers (such as, for example, data center 210 of FIG. 2). As indicated at block 510, it is determined to store a second data item in one of the first plurality of data centers based on analyzing the token. As indicated at block 512, the second data item is stored in the one of the first plurality of data centers (such as, for example, data center 210 of FIG. 2).

For example, a user device transmits a user preference which is received at a user interface server, as indicated at block 502. This user preference indicates an affinity group, and also indicates that the affinity group should be associated with a particular set of data centers. A token associated with this affinity group and indicating the set of data centers is stored in a database, as shown at block 504. The user then indicates an CSS file as being associated with the affinity group, either through the user of a user interface or through the use of a logical DNS associated with the affinity group. A token associated with the affinity group token is analyzed, and it is determined to store the CSS file in one of the set of data centers. The user then indicates an HTML file as being associated with the affinity group. The token is again analyzed, and it is again determined to store the HTML file in one of the set of data centers.

Continuing on with the above example, the user may have indicated, through the use of a user interface, that the CSS file should be associated with the first affinity group. Alternatively, it may be automatically determined that the CSS file should be associated with the affinity group based on user interaction with a logical DNS or by analyzing user preferences or traits—i.e., the user may have created only one affinity group (or may have indicated that all subsequently uploaded files should be associated with the affinity group). Similarly, the HTML file may likewise be associated with the affinity group either through explicit indication or an analysis of user preferences or traits. These two files, being associated with the same affinity group, are stored according to the affinity group configuration (e.g., in the geographic region associated with the affinity group). These files maintain their affinity group affiliation and can be relocated, duplicated, deleted, modified or synchronized as necessary based on their affinity group affiliation.

Figure 6:
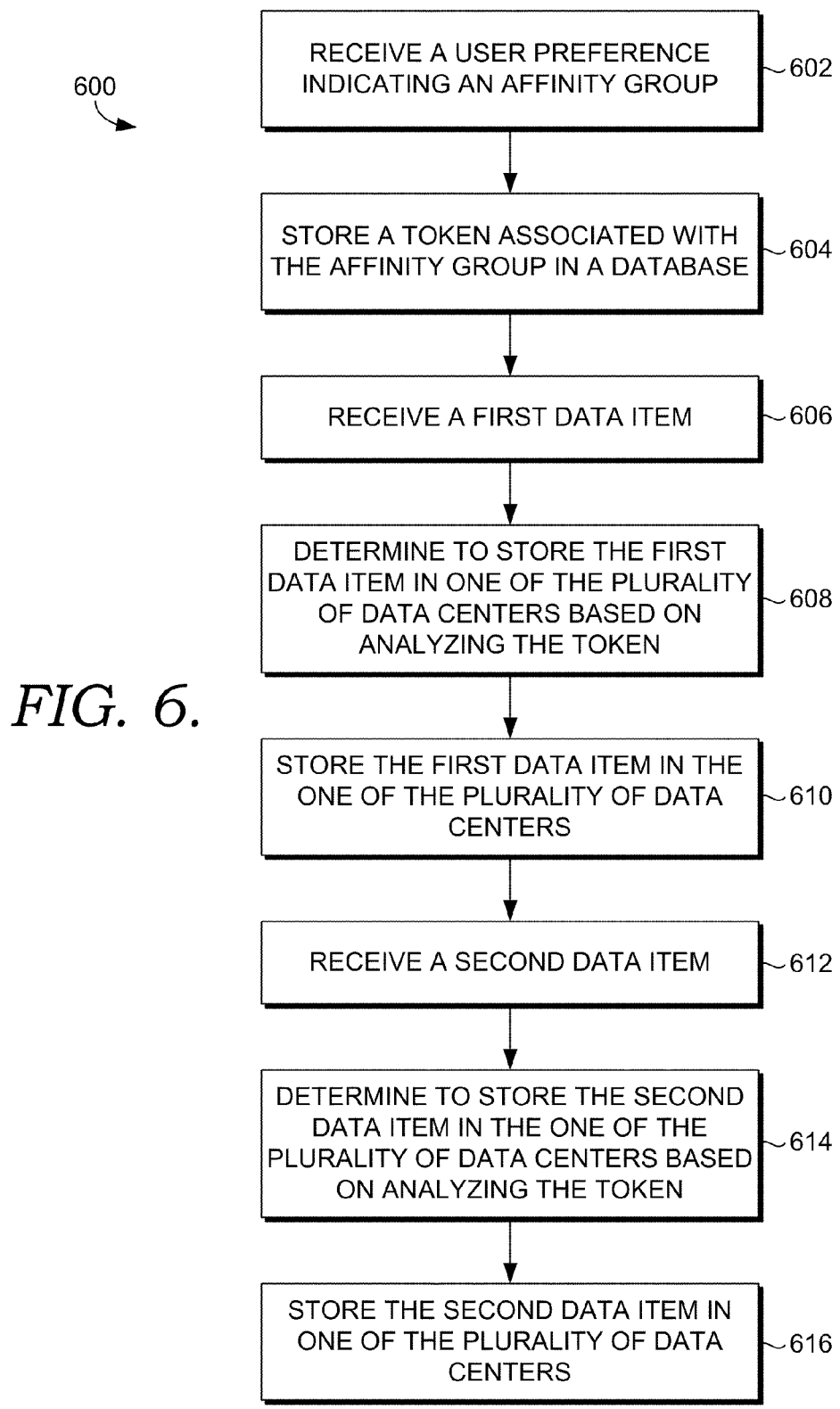
FIG. 6 is a flow diagram illustrating a method for allocating data items in accordance with an embodiment of the present invention.

Turning now to FIG. 6, a flow diagram is illustrated that shows a method 600 for allocating data items. As indicated at block 602, user preference is received (for instance, by user interface server 202 of FIG. 2). This user preference indicates an affinity group. A token associated with the affinity group is stored in a database, as indicated at block 604 (e.g., at token store 310 of FIG. 3). A first data item is received, as shown at block 606. As indicated at block 608, it is determined to store the first data item in one of the first plurality of data centers based on analyzing the token. As indicated at block 610, the first data item is stored in the one of the first plurality of data centers (such as, for example, data center 210 of FIG. 2). A second data item is received, as shown at block 612. As indicated at block 614, it is determined to store the second data item in one of the first plurality of data centers based on analyzing the token. As indicated at block 616, the second data item is stored in the one of the first plurality of data centers (such as, for example, data center 210 of FIG. 2).

For example, a cell phone transmits a user preference which is received at a user interface server, as indicated at block 602. This user preference indicates that a first affinity group should be associated with Japan. A token associated with the first affinity group and indicating Japan is stored in a database, as shown at block 604. The user then uploads a spreadsheet file. The token is analyzed, and it is determined to store the spreadsheet file in one of a set of data centers located in or around Japan. The spreadsheet is the stored in one of the set of data centers. The user then uploads a WAV file. The token is again analyzed, and it is again determined to store the WAV file in one of the set of data centers. The WAV file is the stored in one of the set of data centers.

Continuing on with the above example, the user may indicate he or she desires a computing resource, such as an image processing service, to be associated with the first affinity group. The token is then analyzed, and it is determined to allocate the image processing service to a data center in or near Japan. Thus the spreadsheet file, WAV file, and image processing service, through their associations with the first affinity group, can automatically be allocated in data centers in or near Japan. Later, the user may indicate that he wishes to duplicate his resources from the first affinity group associated with Japan to data centers in Western Europe (perhaps, for example, to efficiently serve data and image processing to users located in Western Europe). The user thus creates a second affinity group associated with Western Europe. The user may then indicate, through the use of a user interface, that he or she wishes to duplicate the resources associated with the first affinity group (i.e., the spreadsheet file, the WAV file, and the image processing service) to the second affinity group. These data items and computing resources are then duplicated to servers located in or near Western Europe. Resources associated with the first data group may also be synchronized with the resources from the second data group. For example, the user might add an entry to the spreadsheet on a Japanese data center. Upon determining that this spreadsheet is affiliated with two affinity groups, the analogous spreadsheet residing on a data center in Western Europe may be modified accordingly to keep the spreadsheets similar.

It should be noted that user interface 302 may provide the ability to view, create, modify or configure a trait or a number of traits associated with an affinity group. For example, user interface 302 may provide an interface or API functionality for a user to view, create or modify an affinity group's name, geo-location associations, data center associations, pricing structure, traffic analyses, analytics, etc. For example, the user may be shown an affinity group's name through user interface 302. The user may then interact with user interface 302 to modify the affinity group's name. In another example, the user may be shown the pricing structure associated with the affinity group. For example, a particular geo-region associated with the affinity group may have a particular pricing model for its associated data centers while a particular bandwidth plan associated with the affinity group may have its own particular pricing model. Multiple pricings associated with the affinity group may be blended and presented to the user as a pricing structure for the affinity group. In addition, a traffic analysis for the affinity group may be a trait that is presented. Such a traffic analysis may include, for example, the traffic for the particular affinity group broken down by hours-of-the-day, day-of-the-week, daily averages, month-of-the-year, regional-traffic, etc. Analytics of the affinity group could also be presented to the user showing, for example, the location of the users accessing the data items and computing resources for the affinity group, the length of time spent viewing data items associated with the affinity group, the amount of processing time used over a time period, the number of SQL requests made since the inception of the affinity group, etc.

Embodiments of the present invention have been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. One or more computer-storage media devices storing computer-useable instructions that, when executed by a computing device, perform a method for allocating a data item, the method comprising:
    receiving a first user preference for a first affinity group, the first affinity group being associated with a first data center, wherein the first user preference indicates a user selection of the first affinity group, wherein the first affinity group is associated with a first token generated based on one or more of associating data with the first affinity group and associating traits with the first affinity group;
    storing the first token associated with the first affinity group in a database;
    determining, with a processor, to store a first data item in the first data center based on analyzing the first token;
    storing the first data item in the first data center;
    determining to duplicate the first data item to a second data center, the second data center being associated with a second affinity group, the second affinity group being associated with a second token;
    duplicating the first data item to the second data center,
    wherein determining to duplicate the first data item is based on an efficiency analysis, said efficiency analysis comprising one or more of the following:
    (1) a comparison of an average amount of latency for retrieval of data items from the first data center to an average amount of latency for retrieval of data items from the second data center;
    (2) a comparison of an amount of capacity at a first data center to an amount of capacity at a second data center;
    (3) a determination that the first data center will be temporarily slow or shut down due to upgrades or power outages;
    (4) a determination of an amount of response time associated with at least one of the first data center and the second data center that indicates a failure; and
    (5) a determination that greater processing time is available at the second data center compared to the first data center, thereby indicating that computing resources affiliated with the affinity group are optimally allocated at the second data center; and
    allocating a copy of the first data item to a second data center, the second data center being associated with the first affinity group.

2. The one or more computer-storage media devices of claim 1, further comprising storing a second data item in the first data center.

3. The one or more computer-storage media devices of claim 1, further comprising associating a user with the first token.

4. The one or more computer-storage media devices of claim 1, further comprising:
receiving a request for the first data item;
determining to have the second data center transmit the first data item based on an efficiency analysis; and
transmitting the first data item from the second data center.

5. The one or more computer-storage media devices of claim 1, further comprising allocating a computing resource at the first data center.

6. The one or more computer-storage media devices of claim 1, further comprising modifying the first token.

7. The one or more computer-storage media devices of claim 1, further comprising presenting a trait of an affinity group to a user.

8. The one or more computer-storage media devices of claim 7, further comprising receiving user data associating the affinity group with a data center.

9. The one or more computer-storage media devices of claim 7, wherein the trait comprises one or more of:
an indication that the first data item is associated with the affinity group;
an indication that a computing resource is associated with the affinity a name associated with the affinity group;
a data center associated with the affinity group;
a geo-region associated with the affinity group;
a pricing structure associated with the affinity group;
routing associated with the affinity group;
a traffic analysis associated with the affinity group;
an analytic associated with the affinity group;
an API function associated with the affinity group; and
a failover associated with the affinity group.

10. The one or more computer-storage media devices of claim 1, further comprising:
determining to relocate the first data item to a second data center, the second data center being associated with a second affinity group; and
relocating the first data item to the second data center.

11. The one or more computer-storage media devices of claim 1, further comprising synchronizing the first data center with the second data center.

12. A computer-implemented method for allocating data items, the method comprising:
receiving a user preference for an affinity group, the affinity group being associated with a plurality of data centers, wherein the user preference indicates a user selection of the affinity group;
storing a token associated with the affinity group in a database;
determining to store a first data item in one of the plurality of data centers based on analyzing the token in a first computer process and providing the determination to a second computer process, wherein determining to store the first data item in one of the plurality of data centers comprises performing an efficiency analysis of the first data item, wherein performing the efficiency analysis of the first data item comprises one or more of the following:
(1) a comparison of an average amount of latency for retrieval of data items from a first data center to an average amount of latency for retrieval of data items from a second data center;
(2) a comparison of an amount of capacity at a first data center to an amount of capacity at a second data center;
(3) a determination that the first data center will be temporarily slow or shut down due to upgrades or power outages;
(4) a determination of an amount of response time associated with at least one of the first data center and the second data center that indicates a failure; and
(5) a determination that greater processing time is available at the second data center compared to the first data center, thereby indicating that computing resources affiliated with the affinity group are optimally allocated at the second data center;
storing the first data item in the one of the plurality of data centers by the second computer process;
determining to store a second data item in the one of the plurality of data centers based on analyzing the token in a third computer process and providing the determination to a fourth computer process, wherein determining to store the second data item in one of the plurality of data centers comprises performing an efficiency analysis of the second data item;
storing the second data item in the one of the plurality of data centers by the fourth computer process; and
allocating a copy of the first data item and the second data item in the one of the plurality of data centers, the one of the plurality of data centers being associated with the first affinity group.

13. The computer-implemented method of claim 12, further comprising synchronizing a data item of a second data center with the first data item of the one of the plurality of data centers by a fifth computer process.

14. The computer-implemented method of claim 12, further comprising allocating a computing resource to one of the plurality of data centers by a fifth computer process.

15. One or more computer-storage media devices, storing computer-useable instructions that, when executed by a computing device, perform a method for allocating data items, the method comprising the steps of:
receiving a user preference for an affinity group, the affinity group being associated with a geographic region, the geographic region being associated with a plurality of data centers, wherein the user preference indicates a user selection of the affinity group;
storing a token associated with the affinity group in a database;
receiving a first data item, the first data item having an attribute indicating an association with the token;
determining, with a processor, to store the first data item in one of the plurality of data centers based on analyzing the token and performing an efficiency analysis of the first data item, wherein performing the efficiency analysis of the first data item comprises one or more of the following:
(1) a comparison of an average amount of latency for retrieval of data items from a first data center to an average amount of latency for retrieval of data items from a second data center;
(2) a comparison of an amount of capacity at a first data center to an amount of capacity at a second data center;
(3) a determination that the first data center will be temporarily slow or shut down due to upgrades or power outages;
(4) a determination of an amount of response time associated with at least one of the first data center and the second data center that indicates a failure; and
(5) a determination that greater processing time is available at the second data center compared to the first data center, thereby indicating that computing resources affiliated with the affinity group are optimally allocated at the second data center;

storing the first data item in the one of the plurality of data centers;

receiving a second data item, the second data item having an attribute indicating an association with the token;

determining, with a processor, to store the second data item in the one of the plurality of data centers based on analyzing the token and performing an efficiency analysis of the second data item;

storing the second data item in one of the plurality of data centers; and allocating a copy of the first data item to one of the plurality of data centers, the one of the plurality of data centers being associated with the first affinity group.

16. The one or more computer-storage media devices of claim 15, further comprising allocating a computing resource to one of the plurality of data centers based on analyzing the token.

17. The one or more computer-storage media devices of claim 16, further comprising:

synchronizing the computing resource with a computing resource at another data center;

synchronizing the first data item in the one of the plurality of data centers with a data item at another data center; and synchronizing the second data item in the one of the plurality of data centers with a data item at another data center.

* * * * *